WOW# UNITED STATES PATENT OFFICE.

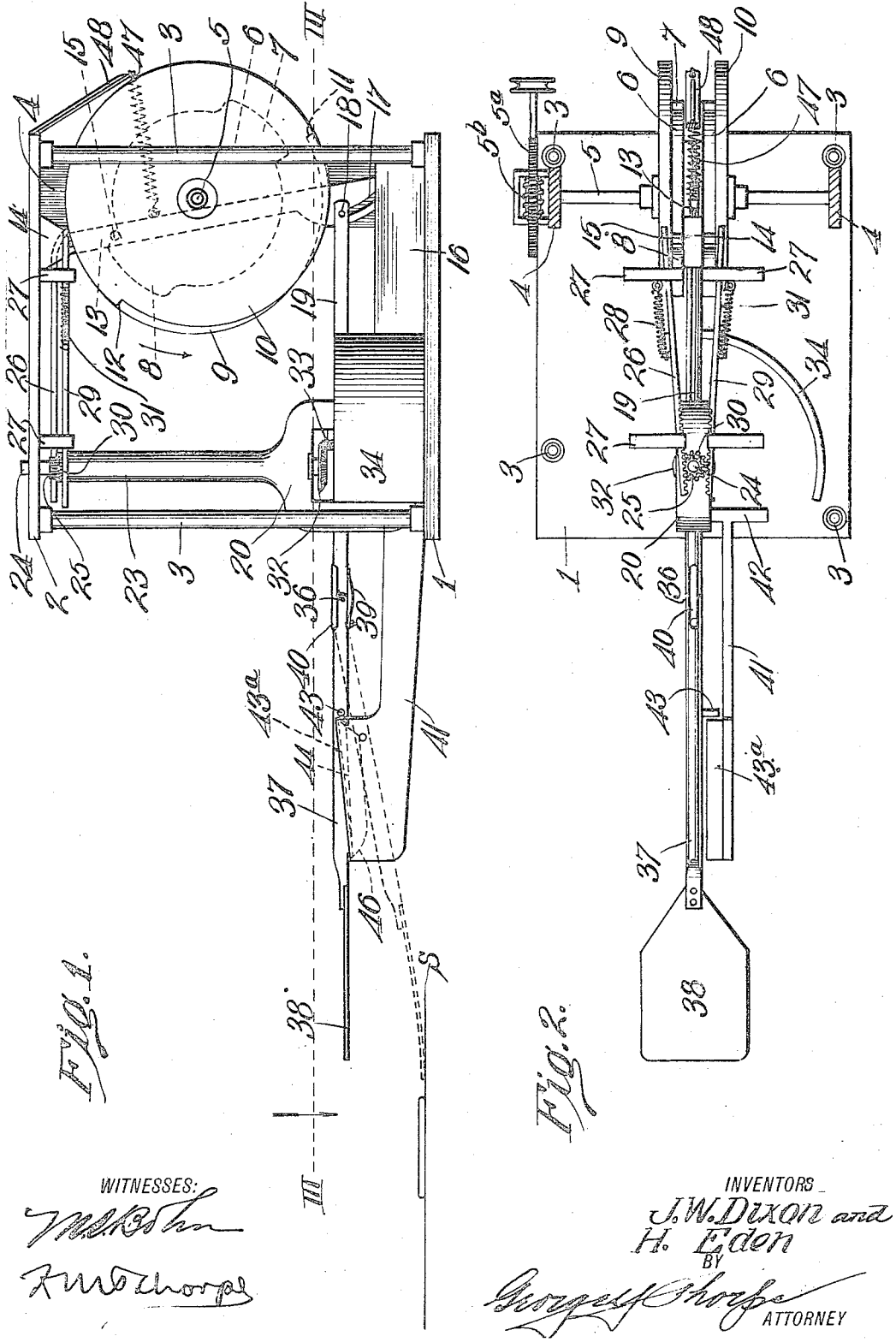

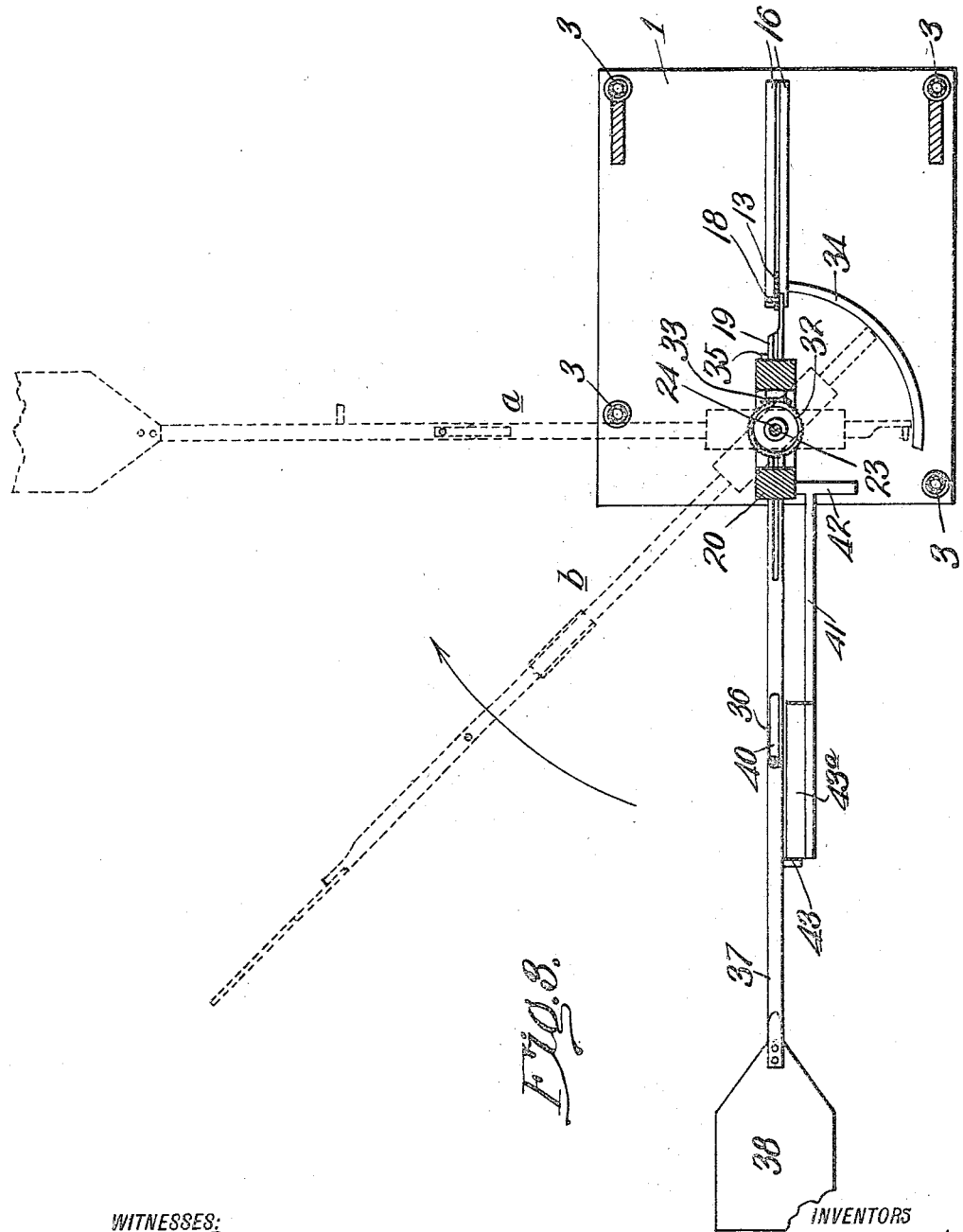

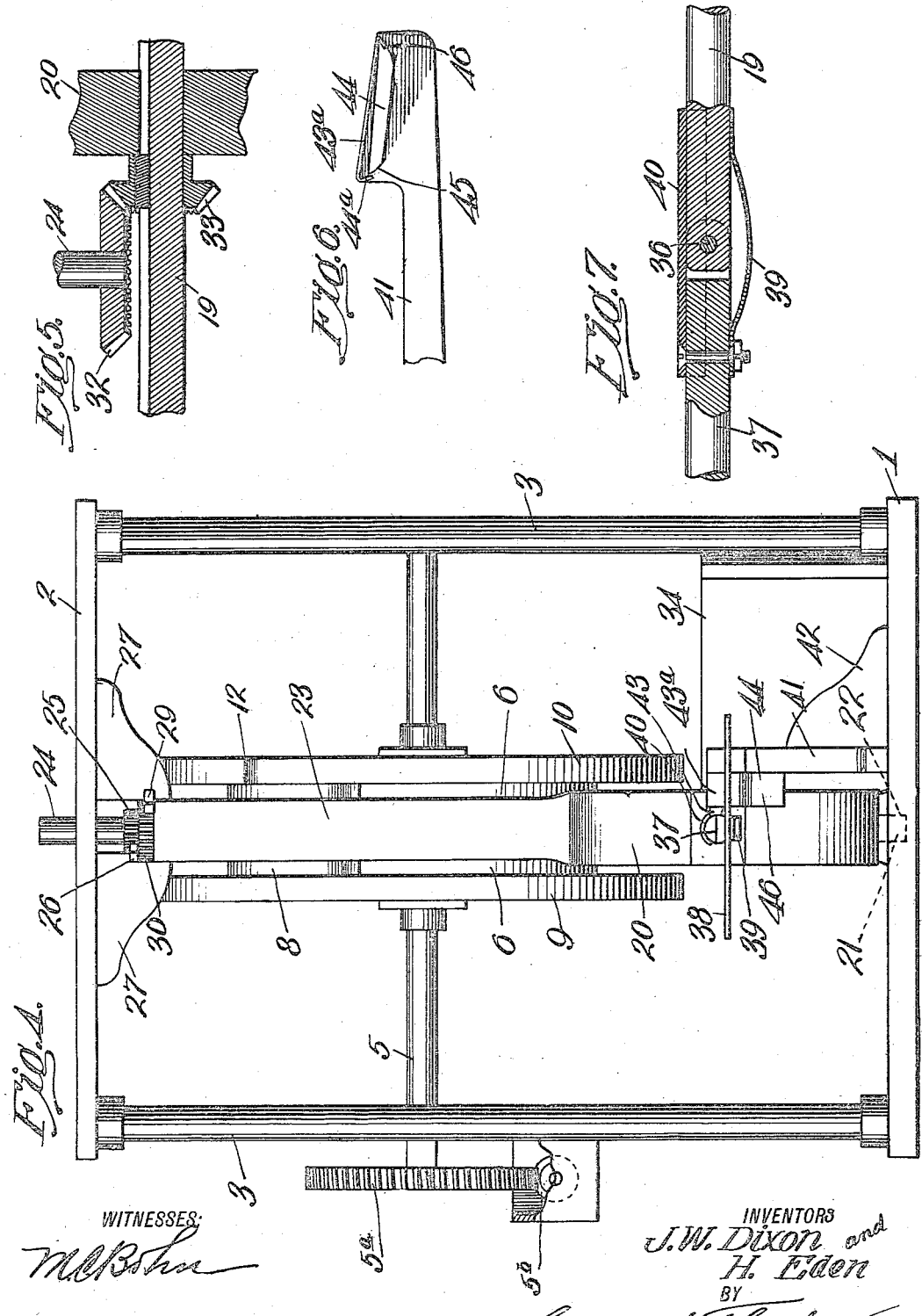

JOHN W. DIXON AND HENRY EDEN, OF KANSAS CITY, MISSOURI.

BATTER-CAKE MACHINE.

1,265,629.  Specification of Letters Patent.  Patented May 7, 1918.

Application filed August 25, 1916. Serial No. 116,939.

*To all whom it may concern:*

Be it known that we, JOHN W. DIXON and HENRY EDEN, citizens of the United States, residing at Kansas City, in the county of Jackson and State of Missouri, have invented certain new and useful Improvements in Batter-Cake Machines, of which the following is a specification.

This invention relates to batter cake machines, and has for its object to produce a machine which at a predetermined time will by means of a peel, pick up a batter cake, turn it over, and drop it back upon the cooking surface or griddle and then after a predetermined interval of time, again pick up the cake and carry it to one side and drop it into a suitable receptacle placed for the purpose, repeating these operations in the order named as long as power is applied to it.

With this general object in view the invention consists in certain novel and peculiar features of construction and organization of parts as hereinafter described and claimed; and in order that it may be fully understood reference is to be had to the accompanying drawings, in which:

Figure 1, is a side elevation of a batter cake machine embodying the invention.

Fig. 2, is a top plan view with the top of the frame-work omitted.

Fig. 3, is a horizontal section taken on the line III—III of Fig. 1.

Fig. 4, is an enlarged front view of the machine.

Fig. 5, is an enlarged fragmentary section showing part of the mechanism for swinging and rotating the peel.

Fig. 6, is a view of the opposite side of the peel-guiding device from that shown by Fig. 1.

Fig. 7, is a vertical section showing the connection between the peel and the carrying shaft therefor.

In the said drawings where like reference characters identify corresponding parts in all the figures, 1 and 2 indicate the top and bottom of the frame-work of the machine, and 3 posts or standards secured to the bottom and supporting the top, one of the front standards 3 being set back preferably, as shown, for a purpose which hereinafter appears.

Near the rear standards, the frame is provided with a pair of side bars 4 providing a bearing for a transverse shaft 5, adapted to be driven continuously at a relatively slow speed by a motor, not shown, of any suitable type. Preferably the shaft at one end will carry a worm wheel $5^a$ meshing with and driven by a suitably-supported worm $5^b$, and the motor referred to will be connected in any suitable manner, to drive the worm.

Secured rigidly on shaft 5 is a pair of disks 6 spaced apart, and each provided at corresponding points with peripheral cam lugs 7 and at other corresponding points with peripheral cam lugs 8, and rigidly secured to or formed integrally with said disks 6 is a pair of larger disks 9 and 10, disk 9 having a cam shoulder 11 for effecting the turning of a cake upon a griddle so that the opposite side of the cake shall bake. The disk 10 has a similar shoulder 12 for causing the peel, hereinafter described, to swing to one side and through certain connections, rotate or turn, the peel in its swinging movement carrying a cake and by its turning movement dropping the same into a suitable receptacle.

A lever 13, is pivotally suspended from bearing 14, depending from the top 2, and is adapted to swing forward and backward between the spaced disks 6 forward of the shaft 5, the said lever having a cross-pin 15 against which the cam lugs 7 and 8 alternately apply pressure, to impart forward movement to the peel, as hereinafter explained, it being apparent that as the disks are provided with two sets of cams, the peel must be advanced twice in each revolution of shaft 5. The lower end of the lever 13 operates between a pair of guides 16 upon the base or bottom 1, and is provided with a curved slot 17 engaged by a cross-pin 18 secured in the rear end of a shaft 19. Said shaft is mounted to slide and rotate in a yoke 20 having a central pivot or trunnion 21 journaled in a socket 22 in the base or bottom 1. The yoke is provided with an upwardly-projecting tubular arm 23 in alinement with the said trunnion, and extending through and journaled in said arm 23 is a shaft 24 which is journaled at its upper end in the top 2 of the frame-work, and constitutes the upper trunnion for the yoke.

The shaft 24 is equipped above the yoke with a cog wheel 25 meshing with a slidable rack bar 26 mounted in guides 27 depending from the top of the frame, the rear end of said rack bar being held in the path of shoulder 11 by means of a retractile spring 28 attached at its front end to the said slide bar and at its rear end to one of the guides 27.

A slidable rack bar 29 is likewise mounted in the guides 27, and engages a cog wheel 30 secured to the upper end of the yoke arm 23, and said rack bar 29 is held in the path of movement of shoulder 12 by a retractile spring 31 secured at its front end to said rack bar and at its rear end to one of the guides 27.

Secured on the lower end of shaft 24 within the yoke 20, is a beveled gear 32 enmeshed with a beveled gear 33 keyed or otherwise mounted upon shaft 19 to turn the same without interfering with or partaking of its sliding movement.

From the foregoing it will be seen that under the rotation of shaft 5 in the direction indicated by the arrow, Fig. 1, shoulder 11 once in each revolution, will engage and slide bar 26 forward and thereby through the engagement of said bar with cog wheel 25, transmit power through shaft 24 and gear wheels 32 and 33 to shaft 19 to rotate the same.

It will also be seen that the rotation of the shaft 5 in the direction mentioned will cause shoulder 12 to engage and slide rack bar 29 forward, and that said rack bar through its engagement with cog wheel 30, will rotate the yoke 20 after shaft 19 has been slid forward its full distance, through the action of the second pair of lugs 8, and that this rotation of the yoke effects simultaneous rotation of said shaft 19 because the beveled gear 33 thereon is turned by travel as a planet gear on the gear 32, which gear 32 in this action acts as a sun gear and is held stationary because the cog wheel 25 on shaft 24 is held from turning by the spring-retracted rack bar 26, and in this connection it will be noted that the said rack bar at times effects turning movement of the shaft 19 and at other times causes turning movement of said shaft by preventing turning movement of beveled gear 32.

By reference particularly to Fig. 3, it will be seen that when the yoke is turned, shaft 19 is free to swing because the crosspin 18 is free to withdraw from the slot in the lower end of lever 13, and to guard against any possibility of backward sliding movement of shaft 19 when disengaged from said slot so that the pin 18 shall reengage said slot when the shaft is brought back to its initial position, the base or bottom is provided with a curved guide 34 against which the rear end of said shaft slides in its swinging movement, excess forward sliding movement of said shaft is prevented by means of a pin 35 which abuts against the rear side of the yoke. The guide 34 and stop pin 35 thus insure that the pin 18 shall travel in an arc which intersects the slot in lever 13, when said lever occupies its advanced position as indicated in Fig. 3, it being noted in this connection that the lever is held in this advanced position by the cam lugs 8 during the swing of the shaft from the full line position shown in Fig. 3 to the dotted position shown at $a$ same figure. The intermediate dotted position $b$ of the shaft in said figure, represents said shaft when it has been turned a quarter revolution and the position $a$ represents said shaft when it has completed a half revolution. It will be understood in this connection however that the length of swing of the shaft may be varied by a change in the size of gear wheel 30, and that the extent of the turning movement of said shaft during said swing may be varied by a change in the proportion of the sun and planet gear wheels, it being of course apparent that the return rotation of the yoke and of the shaft 19 is effected by the retractive action of spring 31 and the back rotation of the planet gear on the sun gear.

Pivoted at 36 to the front end of shaft 19 is the arm or handle 37 of a resilient blade or peel 38, a spring 39 underlying the pivotal point of connection of said shaft and handle and secured to one of said elements at one end and bearing at its opposite end against the other of said elements, this spring yielding to permit downward swinging movement of the peel and reacting to reelevate the peel to normal position, and to limit the upward movement of the peel a stop plate 40 overlies the pivoted end of the peel handle and shaft 19 and is secured to one of the same, preferably to the handle of the peel.

41 is an arm rigid with and projecting forwardly from the base or bottom of the frame-work adjacent a stop lug 42 for positively checking the return rotative movement of the yoke so that the pin 43 projecting laterally from the peel handle shall normally stand in alinement with and back of a spring-plate 43$^a$ secured upon a lug 44, projecting laterally from the arm 41, and said spring-plate normally diverges rearwardly upward from the lug, and is provided with a downwardly and forwardly inclined cam or heel portion 44$^a$, overlapping the rear end of the said lug. Said lug is inclined downwardly and forwardly as indicated in Fig. 6, and at its heel or rear end is beveled downwardly and forwardly to form a cam 45 coöperating with cam 44$^a$, in effecting downward pivotal movement of the peel until the same is pressed flatly at its front edge upon a griddle or other baking surface S, it being understood that this pivotal depression of the peel is caused by the travel of the pin 43 downward on the cams 44ᵃ and 45, in the initial part of each advance movement of the slidable shaft 19, and that the peel is held in its depressed position until the forward movement of said shaft is nearly ended, through the travel of pin 43 upon the underside of lug 44, it being understood that the underside of said lug must slide downwardly and forwardly for the greater part of its length at least in order to hold the peel pressed flatly on the griddle, during which movement the peel is adapted to scoop up a cake lying in its path on the griddle, this picking up of the cake being accomplished just before the forward travel of shaft 19 is completed. During this forward travel of the peel the spring 39 is under tension, and as the forward movement is nearly completed, said spring gradually raises the peel, due to the fact that the front end of the guide lug 44 is tapered upwardly and forwardly as at 46, this gradual lifting of the peel being necessary as a quick reëlevation of the same would tend to flip the cake up from the peel and possibly dislodge it. Just after the spring 39 completes the reëlevation of the peel as explained and while the same is still held in its advanced position by the peripheral engagement of cam lugs 7 with cross-pin 15, shoulder 11 engages and slides rack bar 26 forward and thereby through the cog wheel 25, shaft 24 and pivoted gears 32 and 33, quickly rotates shaft 19 a half revolution, the peel of course turning with the shaft and inverting the cake and dropping it down upon the griddle so that the cake shall be baked upon the other side. Immediately after the cake is dropped back upon the griddle by the peel, the shoulder 11 passes out of engagement with the rack bar 26 to permit the spring 28 to return the rack bar to normal position and thus rotate the peel back to its normal position, and immediately after this action occurs the cam lug 7 passes out of engagement with lever 13 to permit a retractile spring 47 connecting said lever with a fixed arm 48 of the frame-work, to swing said lever back to the position shown in Fig. 1. In the return of the lever and consequently of the slide shaft 19 and the peel, the pin 43 travels back over and depresses the spring-plate 43ᵃ, so that said plate shall spring up to its original position when the pin 43, clears its rear end, to dispose its cam portion 44ᵃ in the path of said pin so that the latter in its next advance movement shall again effect the depression of the peel.

The disks are of such proportion and their speed of rotation will be so gaged that by the time lugs 8 come in contact with cross-pin 15 of the lever, the baking of the cake will be completed. The engagement of lugs 8 with said pin will cause the peel to advance and swing downward as described, and travel forward to scoop up the cake, and be returned to its elevated position by the spring 39. As this result is attained, shoulder 12 engages and advances the rack bar 29, and through the engagement with cog wheel 30, the yoke swings the peel horizontally to the right. At the same time the resistance offered by the beveled gear 32 held immovable by the spring-retracted rack bar 26, effects rotation and travel of the beveled gear 33, and thereby rotates shaft 19 for the purpose of turning the peel to discharge the cake into a suitable receptacle, the cake ordinarily dropping off the peel by the time it has attained the position $b$, Fig. 3. The further swing and turning movement of the peel however will insure the discharge of the cake. The peel is swung back to normal position as will be understood from the preceding description of the operation of shaft 19, and at the same time the peel will be rotated back to its initial position so that pin 18 as the backward swing is completed will reënter the slot of lever 13—from which it was withdrawn in its initial swinging movement—and immediately after the pin enters said slot, the cam 8 passes pin 15 and permits spring 47 to withdraw the peel back to the position shown in full lines Fig. 1.

All subsequent operations are repetitions of those described, it being understood that immediately after a cake is picked up and carried away from the griddle, another charge of batter will be placed thereon to start the baking of the next cake.

From the above description it will be apparent that this machine possesses the features of advantage enumerated as desirable in the statement of the object of the invention, and it is to be understood that it is susceptible of change in form, proportion, detail construction and organization without departing from the principle of construction involved or sacrificing any of the advantages of the appended claims.

We claim:

1. In a machine of the character described, a peel, means for advancing the same, means for depressing the peel in the initial portion of its advance movement, and means for reëlevating the peel as its advance movement is concluded.

2. In a machine of the character described, a peel, means for advancing the same, means for depressing the peel in the initial portion of its advance movement, means for reëlevating the peel as its advance movement is concluded, and means for inverting the peel when reëlevated.

3. In a machine of the character described, a peel, means for advancing the same, means for depressing the peel in the initial portion of its advance movement, means for reëlevating the peel as its advance movement is concluded, means for inverting the peel when reëlevated, and means for returning the inverted peel to upright position.

4. In a machine of the character described, a peel, means for advancing the same, means for depressing the peel in the initial portion of its advance movement, means for reëlevating the peel as its advance movement is concluded, and means for rotating the peel a half revolution to inverted position after it has been reëlevated.

5. In a machine of the character described, a peel, means for advancing the same, means for depressing the peel in the initial portion of its advance movement, means for reëlevating the peel as its advance movement is concluded, means for rotating the peel a half revolution to inverted position after it has been reëlevated, and means to reverse the rotation of the peel to restore it to upright position.

6. In a machine of the character described, a peel, means for advancing the same, means for depressing the peel in the initial portion of its advance movement, means for reëlevating the peel as its advance movement is concluded, means for inverting the peel when reëlevated, means for returning the inverted peel to upright position, and means to impart backward movement to the peel to return it to its original position.

7. In a machine of the character described, a peel, means for advancing the same, means for depressing the peel in the initial portion of its advance movement, means for reëlevating the peel as its advance movement is concluded, means for rotating the peel a half revolution to inverted position after it has been reëlevated, means to reverse the rotation of the peel to restore it to upright position, and means to impart backward movement to the peel to return it to its original position.

8. In a machine of the character described, a peel pivotally supported for movement in a vertical plane and provided with a laterally projecting pin, means to impart forward movement to the peel, a guiding device disposed in the path of said pin to cause the same in the initial part of the forward movement of the peel, to move downward to depress the peel and resilient means to reëlevate the peel when the same has been advanced sufficiently for its said pin to clear the front end of said device.

9. In a machine of the character described, a peel pivotally supported for movement in a vertical plane and provided with a laterally projecting pin, means to impart endwise reciprocatory movement to the peel, yielding means for holding the peel in a substantial horizontal position, a guiding device for engagement by said pin in one movement of the peel to depress the latter in the initial part of and hold it depressed during such movement, and to yield to said pin on the reverse endwise movement of the peel and then return to its initial position in the path of movement of said pin.

10. In a machine of the character described, a peel, means for advancing the same, means for depressing the peel in the initial portion of its advance movement, means for reëlevating the peel as its advance movement is completed, and means to swing the peel laterally.

11. In a machine of the character described, a peel, means for advancing the same, means for depressing the peel in the initial portion of its advance movement, means for reëlevating the peel as its advance movement is completed, means to swing the peel laterally, and means to rotate the peel to dumping position during said swinging movement.

12. In a machine of the character described, a peel, means for advancing the same, means for depressing the peel in the initial portion of its advance movement, means for reelevating the peel as its advance movement is completed, means to swing the peel laterally, means to rotate the peel to dumping position during said swinging movement, means to reverse the swing operation of the peel, and means to reverse the rotation of the peel during its said reverse swinging operation.

13. In a machine of the character described, a shaft supported for rotatable and end-wise movement, a peel carried by said shaft, means for reciprocating said shaft, and means to rotate said shaft while the same is at the end of the first half of its reciprocatory movement to inverted position and back again to upright position.

14. In a machine of the character described, a shaft supported for rotatable and end-wise movement, a peel carried by said shaft, means for reciprocating said shaft, a rack bar, gearing between the rack bar and said shaft, means for operating the rack bar in one direction to rotate said shaft when at the end of the first half of its reciprocatory movement, and a spring to return said rack bar to normal position and effect back rotation of the shaft to normal position before the shaft makes the second half of its reciprocatory movement.

15. In a machine of the character described, a shaft supported for rotatable and endwise movement, a peel carried by said shaft, means for reciprocating said shaft, a gear wheel mounted upon said shaft to turn the same without interfering with its reciprocating movement, a shaft geared to said gear wheel, a rack bar geared to said shaft, means to operate the rack bar in one direction while the shaft is at the end of the first half of its reciprocatory movement, and a spring to reverse the operation of the rack bar before the shaft makes the second half of its reciprocatory movement.

16. In a machine of the character described, a shaft supported for rotatable and end-wise movement, a peel carried by said shaft, means for reciprocating said shaft, a gear wheel mounted upon said shaft to turn the same without interfering with its reciprocating movement, a shaft geared to said gear wheel, a rack bar geared to said shaft, a driven wheel provided with a shoulder for operating the rack bar in one direction and releasing the same while the shaft is at the end of the first half of its reciprocatory movement, and means to return the rack bar to its initial position immediately after it is released by said shoulder and before it makes the second half of its reciprocatory movement.

17. In a machine of the character described, a shaft supported for rotatable and end-wise movement, a peel carried by said shaft, a lever having a detachable pin-and-slot connection with said shaft and provided with a laterally projecting pin, a driven wheel provided with a cam for engaging said pin to operate the lever and advance said shaft, means to rotate said shaft in one direction while the said lever is held advanced by said pin and incidentally break the pin-and-slot connection between said shaft and said lever, coöperating means to effect back rotation of said shaft and incidentally reëstablish said pin-and-slot connection before said cam releases said lever, and means to return the said lever to its original position after said cam releases it and thereby slide the shaft back to its original position.

18. In a machine of the character described, a shaft supported for rotatable and end-wise movement, a peel carried by said shaft, a lever having a detachable pin-and-slot connection with said shaft and provided with a laterally projecting pin, a driven wheel provided with a cam for engaging said pin to operate the lever and advance said shaft, means to rotate said shaft in one direction while the said lever is held advanced by said pin and incidentally break the pin-and-slot connection between said shaft and said lever, coöperating means to effect back rotation of said shaft and incidentally reëstablish said pin-and-slot connection before said cam releases said lever, means to return the said lever to its original position after said cam releases it and thereby slide the shaft back to its original position, and coöperating means for preventing endwise movement of said shaft while the same is disengaged from said lever and is being rotated.

19. In a machine of the character described, a vertical yoke mounted for horizontal rotation, a shaft extending through the arms of the yoke for sliding and rotatable movement therein, a peel carried by and at the front end of said shaft, means to reciprocate said shaft, means to rotate said yoke while the shaft is at the end of the first half of its reciprocatory movement, and means to reverse the rotation of said yoke while the shaft is at the end of the first half of its reciprocatory movement.

20. In a machine of the character described, a vertical yoke mounted for horizontal rotation, a shaft extending through the arms of the yoke for sliding and rotatable movement therein, a peel carried by and at the front end of said shaft, means to reciprocate said shaft, means to rotate said yoke while the shaft is at the end of the first half of its reciprocatory movement, means to reverse the rotation of said yoke while the shaft is at the end of the first half of its reciprocatory movement, and means geared to said wheel on said shaft to rotate the latter in one direction as said yoke is first turned and in the opposite direction as the yoke is reversely turned.

In testimony whereof, we affix our signatures, in the presence of two witnesses.

JOHN W. DIXON.
HENRY EDEN.

Witnesses:
  K. M. THORPE,
  G. Y. THORPE.